United States Patent [19]

Bliss

[11] Patent Number: 4,611,703
[45] Date of Patent: Sep. 16, 1986

[54] SAFETY LOCK FOR ROTATING MACHINERY

[76] Inventor: William L. Bliss, P.O. Box 246, Newkirk, Okla. 74647

[21] Appl. No.: 414,798

[22] Filed: Sep. 3, 1982

[51] Int. Cl.⁴ .................... F16H 27/02; F16H 31/00; E05C 3/04
[52] U.S. Cl. .................................. 192/135; 192/133; 292/218; 292/DIG. 65
[58] Field of Search ......... 292/54, 213, 218, DIG. 30, 292/DIG. 65; 192/133, 135

[56] References Cited

U.S. PATENT DOCUMENTS

| 631,140 | 8/1899 | Ward et al. | 192/135 |
| 639,685 | 12/1899 | O'Connell | 192/135 |
| 1,546,465 | 7/1925 | Baxter | 192/133 |
| 3,920,110 | 11/1975 | Douglas | 292/DIG. 30 X |
| 4,098,530 | 7/1978 | Edeus | 292/DIG. 30 X |
| 4,286,810 | 9/1981 | Ehmen | 292/DIG. 30 X |

FOREIGN PATENT DOCUMENTS

| 629237 | 4/1936 | Fed. Rep. of Germany | 292/218 |
| 6703 | of 1909 | United Kingdom | 192/135 |

Primary Examiner—Gary L. Smith
Assistant Examiner—Russell W. Illich

[57] ABSTRACT

An apparatus for preventing the opening for one or more access doors to rotating machinery which is confined in some form of enclosure. A shaft from the machinery extends through the enclosure and has a disc attached to it. The disc has one or more radial holes drilled in the periphery to permit the entry of a release rod, but only when the machinery is stopped. The release rod is attached to a pivoted rod which is moved into and out of locking engagement with the doors when the release rod can enter the periphery hole. The pivotal rod contains two locks each for one or more doors. One lock prevents the door from being rotated toward the rod and the second lock prevents the door from being rotated away from the rod unless the pivotal rod is pivoted to release the locks.

3 Claims, 2 Drawing Figures

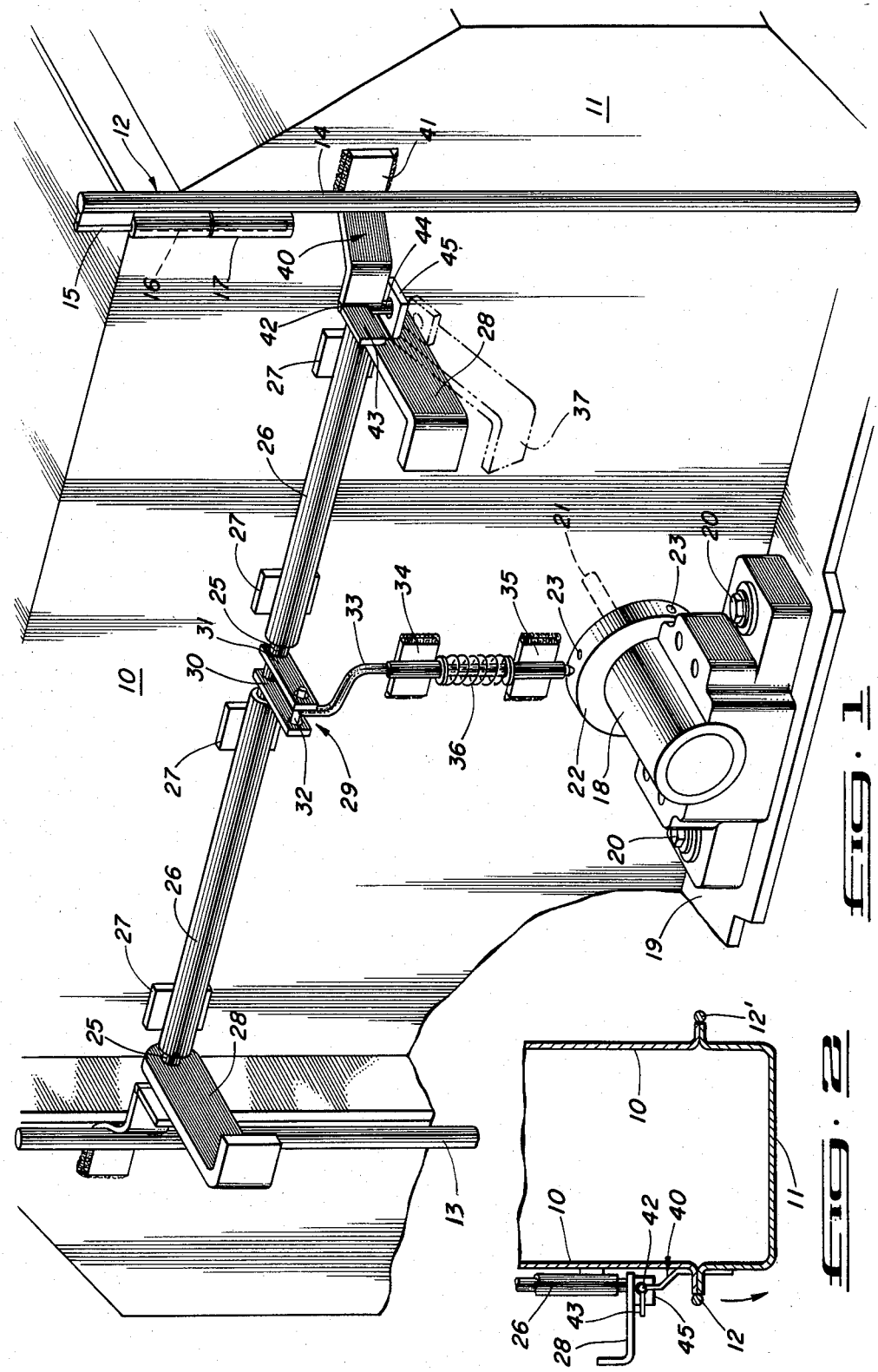

SAFETY LOCK FOR ROTATING MACHINERY

BRIEF DESCRIPTION OF THE PRIOR ART

Previous rotating equipment relied upon warning signs to prevent persons from opening access doors when the equipment was rotating. Unfortunately, many injuries resulted when such warning signs went unheeded. The prior art fails to show a safety lock actually tied directly into the rotating shaft thus preventing opening of the access doors until all rotation of the internal equipment had stopped.

BRIEF DESCRIPTION OF THE INVENTION

This invention describes apparatus for preventing the opening of access doors to an enclosure containing rotating machinery until all rotation of the machinery has stopped.

The above is accomplished by attaching a disc to a shaft coupled to the internal rotating equipment. The disc has one or more radially drilled holes in its periphery. The safety lock is mounted on the side of the enclosure and extends to each (if there are two) door. The lock includes a horizontally pivoted rod which has an unlocking lever adjacent each door. The rod has a lever arm affixed to it over the disc. A release rod is attached to the leverarm and positioned so that it can enter one of the radial holes when the lever arm is rotated. If the machinery is rotating, the disc is rotating thereby making it impossible to jam the release rod in to one of the radial holes of the disc, preventing the rod from being pivoted by the lever arm. Two locks are attached between the lever arm and the door. The first lock prevents the door from being pivoted toward the lever arm when the arm is in the locked position; and the second lock prevents the door from rotating away from the lever when the lever is in a locked position.

BRIEF DESCRIPTION OF THE FIGURES

FIG. 1 is a partial perspective view of the locking apparatus attached to an enclosure, and
FIG. 2 is a cutaway topview of the lock and door.

DETAILED DESCRIPTION OF THE INVENTION

Referring to FIG. 1 and FIG. 2, an enclosure has side walls 10, a door 11, attached by two pairs of releasable hinges 12 and 13. Hinges 12 or 13 comprise a rod 14, having a plurality of upper hinge portions 15, attached thereto. Each upper hinge portion has a hinge pin 16 illustrated by dotted lines, affixed in it. A lower hinge portion 17 is attached to side walls 10 and has an axial opening to receive pin 16. A plurality of hinges (now shown) are positioned along rod 14 as needed to support door 11. Referring to FIG. 2, a similar hinge 12' is attached along the side in a similar fashion.

A motor 18, is mounted to a frame portion 19, by any usual means such as bolts 20. A shaft 21, extends from motor 18, and has attached thereto a disc 22, which has a plurality of radial holes 23, drilled into it around its perimeter. A rod 25, is pivotally attached through a sleeve 26, to side wall 10, using plates 27, for example, which may be welded or bolted to side wall 10. At the ends of rod 25, is attached an unlocking or releasing lever 28. At the center of rod 25, and positioned over disc 22, is a bracket 29, formed from two plates 30 and 31, which are welded or attached at one end to rod 25. The other end has a rod 32, which functions as a pivot for a release rod 33. Rod 33 is slidably attached at two bearings 34 and 35, so that it is positioned directly over one of the holes 23. A spring 36, biases rod 33 away from hole 23 until downward pressure is applied to lever 28, in the direction of arrow 37.

The locking mechanism for the door comprises two separate locks. The door 11, has attached thereto a bracket 40 at one end 41, with a right angle bend 42, at its other end. When door 11, is closed and hinge 12 in place, a portion 43, of bend 42 engages lever 28. A second lock consists of a pin 44, attached to a right angle portion 42, of bracket 40, and a bracket 45, which is attached to lever 28. Bracket 45 has a hole in it to receive pin 44.

OPERATION

The safety locking apparatus operates in the following manner. Motor 18 must be shut off and come to a complete standstill before release rod 33 can enter hole 23. If the equipment is rotating and lever 28 is pulled downward, rod 25 will rotate causing bracket 29 to move rod 33 downward. The end of rod 33 will try to enter hole 23, but the machinery, since it is rotating, will not let the rod enter the holes 23. Lever 28 cannot be moved downward enough to release either of the locks. If the hinge 12' on the far side is removed and the door 11 swung toward the rod 25 and handle 28, portion 43 will strike handle 28 preventing the door from opening. If hinge 12 is removed and the door is forced away from handle 28, pin 44 will still be preventing any movement of the door 11. However, if the motor is stopped, shaft 21 is stopped and disc 22 is likewise stopped. Under these conditions, disc 22 can be slowly rotated until release arm 33 drops into hole 23 when pressure is applied to handle 28. Pressure on handle 28 will cause rotation of rod 25, moving bracket 29 downward. This downward movement will cause release rod 33 to enter hole 23, overcoming the bias of spring 36. The continued downward movement of arm 28 after rod 33 enters hole 23 moves handle 28 away from in front of portion 43. It also moves the handle downwardly along with bracket 45 releasing the portion 43 to move in either direction.

A similar locking apparatus can be provided for one door or doors at each end as illustrated.

It is obvious that the shaft can extend from the motor as illustrated or the shaft can be an internal shaft. It is also obvious, that the disc can be inside or outside the enclosure. If it is inside the enclosure, the rod 33 must enter the housing through a hole in the enclosure, or other lever arms can be incorporated to accomplish the same result.

Changes can be made in the invention as disclosed in the specifications or claims and still be within the spirit and scope of the invention as defined in the apended claim.

What I claim is:

1. Means for securing access to an enclosure confining rotating machinery said enclosure having at least one door attached by hinges to said enclosure, means for securing said door against accidental opening while said machinery is rotating comprising:
   (a) shaft means coupled to said rotating machinery and extending out of said enclosure means;
   (b) disc means attached axially to said shaft means and having an opening means extending radially into its periphery;

(c) rod means pivotally attached to said enclosure and having means attached to said rod means for entering said peripheral opening means when said shaft rotating is stopped, whereby said rod means will pivot when said means is inserted into said opening means;

(d) lever means attached to said rod means for pivoting said rod means;

(e) a stop means attached between said door and said rod means to prevent rotation of said door toward said rod means when said rod means is in an un-pivoted position;

(f) a lock means attached between said door and said rod means to prevent rotating said door away from said rod means when said rod means is in an un-pivoted position, whereby, when said rotating machine is stopped and an opening means is positioned to permit said means to enter said opening means, then said lever means can be operated to pivot said rod means causing said means to enter said opening means and moving said stop means and said locking means out of engagement with said corresponding door stop and locking means thereby permitting said door to rotate in either direction.

2. Apparatus as described in claim 1, wherein said stop on said rod means is a portion of said lever means, and an "L" shaped bracket on said door.

3. Apparatus as described in claim 1 or 2, wherein said lock means is a bracket attached to said lever means and having a pin extending from said bracket, and wherein said cooperating means on said door is a bracket having an opening therethrough, and positioned to permit said pin to pass therethrough, when said lever means and rod means are in an un-pivoted position.

* * * * *